(12) United States Patent
Fowler

(10) Patent No.: US 7,806,023 B2
(45) Date of Patent: Oct. 5, 2010

(54) THUMB GRIP EXTENSION DEVICE FOR MOTORCYCLE THROTTLE SCREW

(76) Inventor: William K. Fowler, 808 Oak St., Miltonvale, KS (US) 67466

( * ) Notice: Subject to any disclaimer, the term of this patent is extended or adjusted under 35 U.S.C. 154(b) by 432 days.

(21) Appl. No.: 11/960,625

(22) Filed: Dec. 19, 2007

(65) Prior Publication Data

US 2008/0196532 A1 Aug. 21, 2008

Related U.S. Application Data

(60) Provisional application No. 60/902,130, filed on Feb. 20, 2007.

(51) Int. Cl.
*G05G 5/06* (2006.01)
(52) U.S. Cl. .......................................... 74/527
(58) Field of Classification Search ............... 74/489, 74/527, 531; 180/219
See application file for complete search history.

(56) References Cited

U.S. PATENT DOCUMENTS

| | | | |
|---|---|---|---|
| 4,285,536 A * | 8/1981 | McCoy et al. ............. | 292/336.3 |
| 5,333,515 A | 8/1994 | Schneider | |
| 6,250,173 B1 | 6/2001 | Huston | |
| 6,457,208 B1 * | 10/2002 | Keith .......................... | 16/422 |
| D572,998 S * | 7/2008 | Crain et al. ................... | D8/305 |
| 2006/0225937 A1* | 10/2006 | Lemoine ...................... | 180/219 |

OTHER PUBLICATIONS

"Throttle Mate for Harley Davidson Motorcycles" advertisement of Tour King, Abilene, Texas, found at www.tourkingcovers.com, Dec. 2007.
"Klever Lever" advertisement of J&P Cycles, found at www.jpcycles.com, Dec. 2007.
"Cruise Buddy" advertisement of J&P Cycles, found at www.jpcycles.com, Dec. 2007.

* cited by examiner

*Primary Examiner*—Vicky A Johnson
(74) *Attorney, Agent, or Firm*—Jeffrey L. Thompson; Thompson & Thompson, P.A.

(57) ABSTRACT

A throttle control assembly includes a throttle screw for retaining a hand grip throttle control in a desired position, and a thumb grip extension device removably attached to the head of the throttle screw to facilitate turning the screw. The thumb grip extension device includes a disc-shaped base, a plurality of detent structures extending above an upper surface of the base, and a handle protruding radially outwardly from one of the detent structures. The detent structures each have a convex outer surface with a curvature that generally corresponds to the outer periphery of the base, a convex inner surface, and a detention ridge protruding from and extending across the convex inner surface at a location spaced from the upper surface of the base. The detent structures are resiliently movable outwardly relative to each other to allow the device to be installed and retained on the head of the throttle screw.

17 Claims, 3 Drawing Sheets

THUMB GRIP EXTENSION DEVICE FOR MOTORCYCLE THROTTLE SCREW

RELATED APPLICATIONS

This application claims priority of U.S. Provisional Application No. 60/902,130 filed on Feb. 20, 2007. The content of this prior application is incorporated herein by reference.

BACKGROUND OF THE INVENTION

1. Field of the Invention

The present invention relates generally to throttle control devices for motorcycles, and in particular, to devices for controlling the setting of a motorcycle hand grip throttle.

2. Description of the Related Art

Controls are commonly used in automobiles to enable a driver to select the speed of the automobile and maintain this speed without depressing the accelerator pedal. Motorcycles have also been equipped with simple controls to retain a throttle in a desired position. Typically, such controls mount on the motorcycle handlebar and are designed to set the hand grip throttle in a desired position. A throttle screw having an enlarged head for engagement by a driver's thumb and/or fingers is often used as a means for retaining the throttle in the desired position.

Examples of throttle position retention systems for motorcycles are disclosed in U.S. Pat. No. 5,333,515 to Schneider, U.S. Pat. No. 6,250,173 to Huston, U.S. Patent Publication No. 2006/0225937 to Lemoine, and U.S. Design Pat. No. D443,851 to Miller. In Lemoine, a lever is provided for attaching to an existing throttle screw to act as an extension enabling the operator to more easily access and adjust the throttle screw. However, the lever requires an attachment screw to secure it to the existing throttle screw, and tends to protrude outside the outer dimensions of the throttle screw at locations other than where the handle projects.

There is a need in the industry for an improved thumb grip extension device for attachment to an existing throttle screw for a motorcycle.

SUMMARY OF THE INVENTION

A throttle control assembly is provided by the present invention for use with a motorcycle of the type having a motorcycle handlebar and a hand grip throttle control. The assembly includes a conventional throttle screw used to retain the hand grip throttle control in a desired position, and a thumb grip extension device removably attached to the head of the throttle screw to enable the operator to more easily access and adjust the throttle screw.

The thumb grip extension device includes a disc-shaped base having upper and lower surfaces, an outer periphery that is generally circular, a plurality of detent structures extending above the upper surface at angularly spaced locations around the base, and a handle protruding radially outwardly from one of the detent structures. The detent structures each have a convex outer surface with a curvature that generally corresponds to the outer periphery of the base, a convex inner surface, and a detention ridge protruding from and extending across the convex inner surface at a location spaced above the upper surface of the base. The detent structures are resiliently movable outwardly relative to each other to allow the device to be installed and retained on the head of the throttle screw. The outer dimensions of the base and detent structures of the thumb grip extension device are approximately the same as the outer dimension of the head of the throttle screw so that the thumb grip extension device can be coupled with the throttle screw without substantially increasing the outer dimension of the throttle screw other than where the handle projects outwardly therefrom. The base, detent structures and handle of the thumb grip extension device can all be formed together as a single molded unit.

According to one aspect of the present invention, a thumb grip extension device is provided for use with a thumbscrew, comprising: a base having an upper surface, a lower surface, and an outer periphery; first and second detent structures extending above the upper surface of the base, the detent structures each having an outer surface, an inner surface on a side opposite from the outer surface, and a detention ridge protruding from the inner surface at a location spaced from the upper surface of the base, the first and second detent structures being resiliently movable outwardly relative to each other; and a handle protruding outwardly for providing leverage to tighten and loosen a thumbscrew on which the device is mounted.

According to another aspect of the present invention, a throttle control assembly is provided, comprising: a throttle screw having an upper end for engaging a throttle component, a head portion at a lower end, and a threaded portion between the upper and lower ends; and a thumb grip extension device as described above removably attached to the throttle screw head portion.

According to another aspect of the present invention, the throttle control assembly described above is provided in combination with a motorcycle of the type having a motorcycle handlebar and a hand grip throttle control apparatus.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A throttle control assembly 10 according to the present invention will now be described in detail with reference to FIGS. 1 to 13 of the accompanying drawings.

Figure 1:
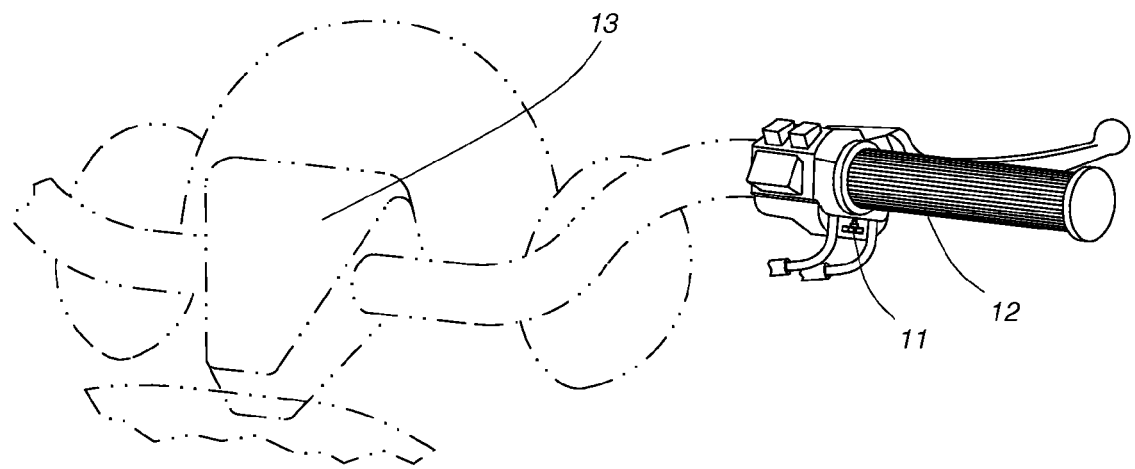
FIG. 1 is a perspective view of a motorcycle handlebar equipped with a hand grip throttle control and a throttle screw used to retain the hand grip throttle control in a desired position.
Figure 2:
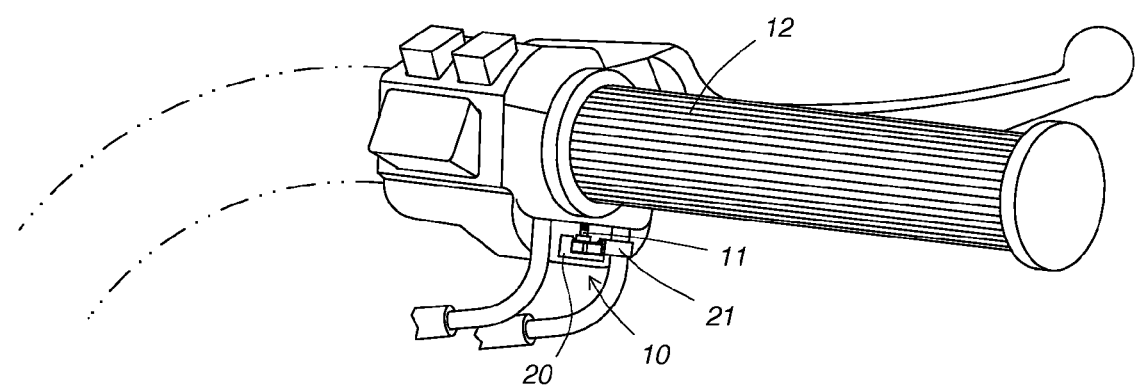
FIG. 2 is a perspective view of the hand grip throttle control with a thumb grip extension device of the present invention coupled to the throttle screw.
Figure 3:
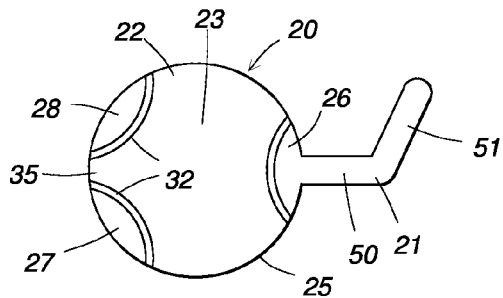
FIG. 3 is a plan view of the thumb grip extension device of the present invention.
Figure 7:
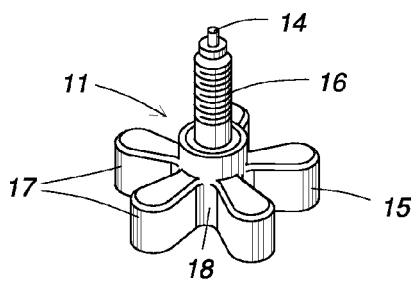
FIG. 7 is a perspective view of a conventional throttle screw.
Figure 6:
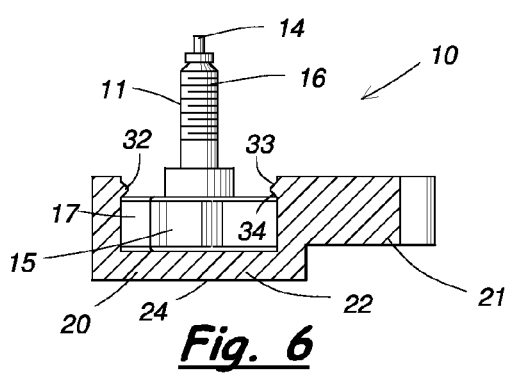
FIG. 6 is a cross section elevation view of the thumb grip extension device coupled with the throttle screw, as viewed along line 6-6 in FIG. 5.
Figure 8:
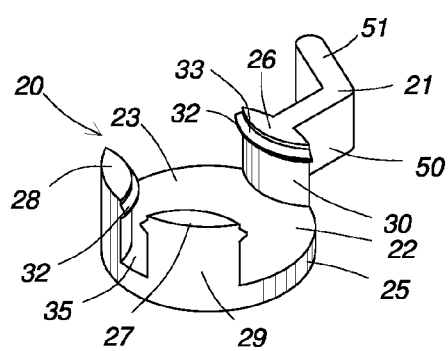
FIG. 8 is a perspective view of the thumb grip extension device according to the present invention.
Figure 9:
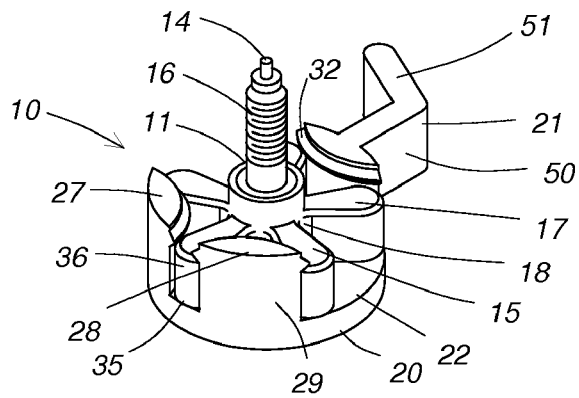
FIG. 9 is a perspective view of the thumb grip extension device coupled with the throttle screw.

The throttle control assembly 10 of the present invention has been developed for use with a particular type of throttle screw 11 used to retain a hand grip throttle control 12 of a motorcycle 13 in a throttle open position. The location of the throttle screw 11 on the motorcycle 13 is shown in FIGS. 1 and 2, and the structural details of the throttle screw 11 are illustrated in FIG. 7. The throttle screw 11 is also sometimes referred to as a thumbscrew, and the terms will be used interchangeably herein.

The throttle screw 11 includes an upper end 14 for engaging a throttle component, a head portion 15 at a lower end, and a threaded portion 16 between the upper and lower ends. The head portion 15 of the throttle screw 11 has a petaloid configuration in which multiple thumb grip structures 17 extend outwardly from a central hub 18. The drawings show a common throttle screw 11 used with Harley Davidson® motorcycles, which has five such thumb grip structures 17 extending outwardly from the central hub 18.

The throttle control assembly 10 includes a thumb grip extension device 20 to facilitate operation of the throttle screw 11. Once the throttle screw 11 is installed and properly set on the motorcycle 13, it requires only a partial rotation to move between a first position in which the throttle control 12 moves freely and a second position in which the throttle control 12 is retained in a desired position. The thumb grip extension device 20 has a handle 21 that protrudes outwardly from the head portion 15 of the throttle screw 11 to provide leverage for tightening and loosening the throttle screw 11.

The thumb grip extension device 20 includes a disc-shaped base 22 having upper and lower surfaces 23, 24 and an outer periphery 25 that is generally circular. For example, the disc-shaped base 22 can have a thickness of approximately 0.125 inch and a radius of approximately 0.469 inch. A first detent structure 26 extends from the base 22 above the upper surface 23. The handle 21 extends radially outwardly from the first detent structure 26. Second and third detent structures 27, 28 extend from the base 22 above the upper surface 23 at locations that are angularly spaced around the base 22 from the first detent structure 26. The base 22, detent structures 26, 27, 28 and handle 21 are preferably all formed together as a single molded plastic unit using, for example, an injection molding process.

The detent structures 26, 27, 28 each have a convex outer surface 29 with a curvature that generally corresponds to the outer periphery 25 of the base 22, and a convex inner surface 30 on a side opposite from the outer surface 29. The outer surfaces 29 of the detent structures 26, 27, 28 are disposed substantially within the outer periphery 25 of the base 22 when viewed in plan view (i.e., the outer surfaces 29 do not protrude outwardly past the outer periphery 25 of the base 22 or the head 15 of the thumbscrew 11).

The inner surfaces 30 of the detent structures 26, 27, 28 have a radius of curvature that is less than a radius of curvature of the corresponding outer surfaces 29 thereof. The inner surfaces 30 are disposed inwardly of the outer surfaces 29, and therefore are also within the outer periphery 25 of the base 22 when viewed in plan view. For example, a suitable radius of curvature for the inner surfaces 30 is about 0.3125 inch, and a suitable radius of curvature for the outer surfaces 29 is about 0.469 inch. Other specific dimensions and curvatures can also be used without departing from the scope of the present invention.

A detention ridge 32 protrudes inwardly from each of the inner surfaces 30 of the detent structures 26, 27, 28. The detention ridges 32 extend across the convex inner surfaces 30 at a location spaced above the upper surface 23 of the base 22. For example, the detention ridges 32 can be spaced approximately 0.235 inch above the upper surface 23 of the base 22 and protrude approximately 0.0319 inch from the inner surfaces 30 of the detent structures 26, 27, 28 to accommodate a conventional sized throttle screw head 15. The detention ridges 32 have tapered upper edges 33 and tapered lower edges 34 to facilitate installation and removal from the throttle screw head 15.

The detention ridges 32 on the detent structures 26, 27, 28 are resiliently movable outwardly relative to each other to allow the device 20 to be installed and retained on the head 15 of the throttle screw 11. More specifically, the second and third detent structures 27, 28 are resiliently movable outwardly relative to the first detent structure 26 on the opposite side of the device 20. The tapered upper and lower edges 33, 34 of the detention ridges 32 cause the detent structures 26, 27, 28 to spread outwardly as the device 20 is installed over and removed from the throttle screw head 15. The resilient movement of the detent structures 26, 27, 28 is accomplished by allowing the base 22 to flex slightly or by flexing the detent structures 26, 27, 28, or by a combination of such flexing. Alternatively, the detent structures 26, 27, 28 could be constructed as separate components that are attached to the base 22 in a manner that allows resilient outward movement of the detention ridges 32 relative to each other.

In one embodiment, the second and third detent structures 27, 28 are angularly spaced about a center axis of the base 22 approximately 72 degrees from each other (as measured from center-to-center). The first detent structure 26 is angularly spaced approximately 144 degrees from the second and third detent structures 27, 28 about the center axis. An open space 35 is defined between the second and third detent structures 27, 28 to accommodate an outer tip 36 of one of the thumb grip structures 17 of the throttle screw head 15.

Figure 5:
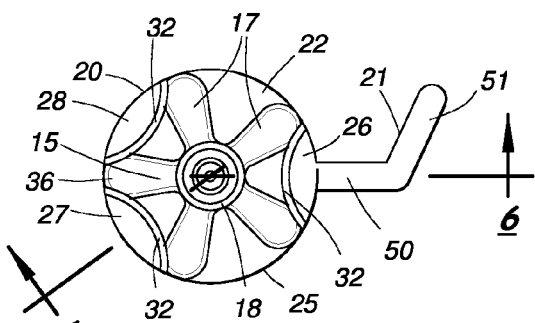
FIG. 5 is a plan view of the thumb grip extension device coupled to the head of a throttle screw.
Figure 4:
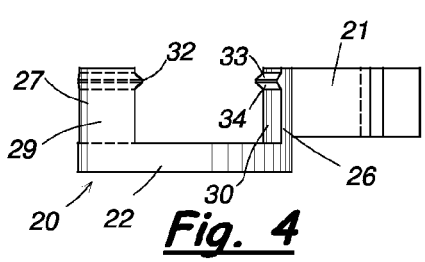
FIG. 4 is an elevation view of the thumb grip extension device.

As shown in FIG. 5, an outer dimension of the head 15 of the throttle screw 11 is approximately the same as an outer dimension of the base 22 and detent structures 26, 27, 28 of the thumb grip extension device 20. This allows the thumb grip extension device 20 to be coupled with the throttle screw 11 without substantially increasing the outer dimension of the throttle screw 11 other than where the handle 21 projects outwardly therefrom.

Figure 10:
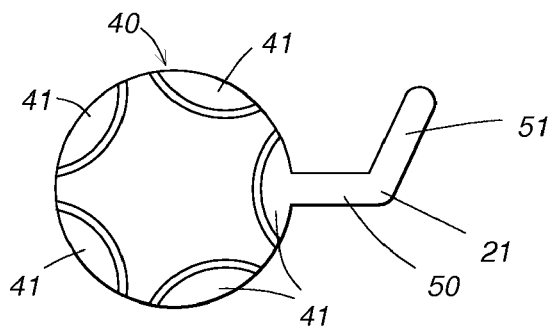
FIG. 10 is a plan view of another embodiment of the thumb grip extension device in which a different number of detent structures are provided.
Figure 11:
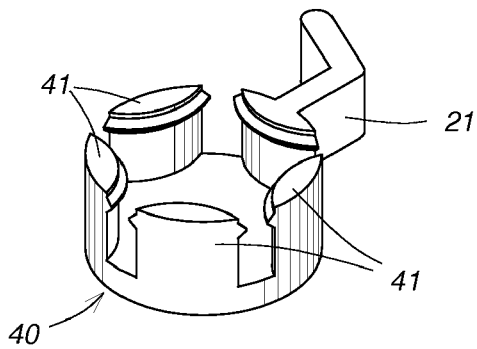
FIG. 11 is a perspective view of the thumb grip extension device shown in FIG. 10.

As shown in FIGS. 10 and 11, a thumb grip extension device 40 can also be formed with a greater number of detent structures 41 to maintain the device 40 coupled with the head 15 of the throttle screw 11. In the illustrated embodiment, five detent structures 41 are provided, instead of three. It should also be appreciated that a thumb grip extension device having as few as two detent structures could be used, although the results would not likely be as good as those achieved with the illustrated embodiments.

The handle 21 of the thumb grip extension device 20 can have various shapes and dimensions to accommodate a particular operator. In the embodiment shown in FIGS. 3, 5 and 8, the handle 21 has a first portion 50 that protrudes radially outwardly from the outer surface 29 of the first detent structure 26, and a second portion 51 that protrudes at an angle from the first portion 50. For example, the second portion 51 can extend at an angle of approximately 115 degrees from the first portion 50, and the first and second portions 50, 51 can be approximately 0.2 to 0.5 inches in length.

Figure 12:
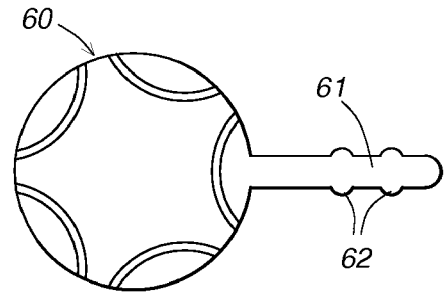
FIG. 12 is a plan view of another embodiment of the thumb grip extension device in which a different handle structure is provided.
Figure 13:
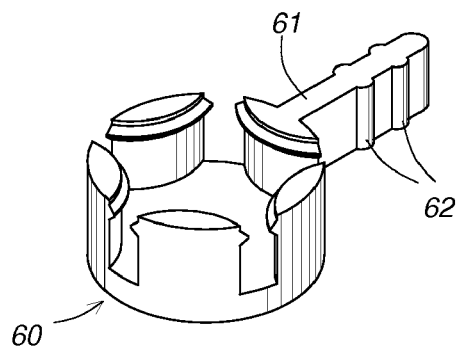
FIG. 13 is a perspective view of the thumb grip extension device shown in FIG. 12.

In another embodiment shown in FIGS. 12 and 13, a thumb grip extension device 60 having a handle 61 with a substantially straight configuration is provided. A plurality of gripper ribs 62 are formed on the handle 61 to improve the surface to be engaged by the operator's finger.

The construction of the thumb grip extension device 20 of the present invention is described above. The installation and use of the device will now be described.

The throttle screw 11 on the hand grip throttle control 12 of a motorcycle 13 is first adjusted to a desired position (e.g., the tightened position) so that it is within a partial rotation of both its first position in which the throttle control 12 moves freely and its second position in which the throttle control 12 is retained in a set position. The proper position of the thumb grip extension device 20 relative to the throttle screw head 15 can then be determined to ensure that, upon installation, the handle 21 will protrude outwardly into a location that can be easily engaged and manipulated by a user's thumb.

The thumb grip extension device 20 is installed on the throttle screw 11 by pushing the device onto the head 15 of the throttle screw 11. As the device 20 is pushed onto the head 15, the detent structures 26, 27, 28 are forced to expand by the tapered edges 33, 34 of the detention ridges 32 protruding from the inner surfaces 30 of the detent structures 26, 27, 28. Once the device 20 is completely pushed onto the head 15 of the throttle screw 11, the detention ridges 32 are above the upper surface of the throttle screw head 15 allowing the detent structures 26, 27, 28 to contract and the detention ridges 32 to serve as retainers to keep the device 20 attached to the throttle screw head 15.

Although the cables and other components on the motorcycle handlebar will usually prevent the handle 21 of the thumb grip extension device 20 from being able to make a complete rotation, the device 20 and throttle screw 11 can be moved a sufficient amount in a partial rotation to move between a position in which the throttle control 12 moves freely and a position in which the throttle control is retained in a desired position.

The terms "upper" and "lower" are used throughout this application and the accompanying claims to correspond with the orientation of the various components when assembled in the manner shown in the drawings. However, it should be understood that these terms are intended only to provide a relative frame of reference, and that the throttle control assembly disclosed herein could also be positioned sideways or upside down from what is shown in the drawings. The applicant's intention is not to limit the claimed invention to any one particular orientation of the throttle control assembly on a motorcycle.

While the invention has been described in connection with specific embodiments thereof, it is to be understood that this is by way of illustration and not of limitation, and the scope of the appended claims should be construed as broadly as the prior art will permit.

What is claimed is:

1. A thumb grip extension device for use with a thumbscrew having a thumbscrew head, the extension device comprising:
   a base having an upper surface, a lower surface, and an outer periphery;
   first and second detent structures extending above the upper surface of the base, said detent structures each having an outer surface, an inner surface on a side opposite from said outer surface, and a detention ridge protruding inwardly beyond the inner surface at a location spaced from the upper surface of the base, said first and second detent structures being resiliently movable outwardly relative to each other;
   a handle protruding outwardly for providing leverage to tighten and loosen a thumbscrew on which said device is mounted;
   a third detent structure extending above the upper surface of the base, said third detent structure having a convex outer surface with a curvature that generally corresponds to the outer periphery of the base, a convex inner surface on a side opposite from said outer surface, and a detention ridge protruding inwardly from the inner surface at a location spaced from the upper surface of the base; and
   an open space defined between said second and third detent structures to accommodate an outer tip of a thumb grip structure of the thumbscrew head so that the extension device can be coupled with the thumbscrew head without protruding outwardly past the thumbscrew head other than where said handle protrudes outwardly therefrom.

2. The thumb grip extension device according to claim 1, wherein said base is disc-shaped and said outer periphery is generally circular, said outer surfaces of the detent structures are convex with a curvature that generally corresponds to the outer periphery of the base, and said inner surfaces of the detent structures are convex with said detention ridges extending across the curved surface thereof.

3. The thumb grip extension device according to claim 2, wherein said outer surfaces of said first and second detent structures are disposed substantially within the outer periphery of the base.

4. The thumb grip extension device according to claim 2, wherein the inner surfaces of said detent structures have a radius of curvature that is less than a radius of curvature of the outer surfaces thereof.

5. The thumb grip extension device according to claim 1, wherein said second and third detent structures are resiliently movable outwardly relative to said first detent structure to allow the device to be installed and retained on the thumbscrew head.

6. The thumb grip extension device according to claim 1, wherein said second and third detent structures are angularly spaced approximately 72 degrees from each other about a center axis that extends through the upper and lower surfaces of the base.

7. The thumb grip extension device according to claim 1, wherein said detention ridges protruding from the inner surfaces of the first and second detent structures have a tapered upper edge to cause the detent structures to spread outwardly as the device is installed over a thumbscrew head to facilitate installation.

8. The thumb grip extension device according to claim 1, wherein said handle protrudes radially outwardly from the outer surface of said first detent structure.

9. The thumb grip extension device according to claim 1, wherein said handle has a first portion that protrudes radially outwardly from the outer surface of said first detent structure, and a second portion that protrudes at an angle from said first portion.

10. The thumb grip extension device according to claim 1, wherein said base, detent structures and handle are all formed together as a single molded unit.

11. A throttle control assembly, comprising:
a throttle screw having an upper end for engaging a throttle component, a head portion at a lower end, and a threaded portion between said upper and lower ends; and
a thumb grip extension device removably attachable to said throttle screw head portion, said thumb grip extension device comprising:
  a base having an upper surface, a lower surface, and an outer periphery;
  first and second detent structures extending above the upper surface of the base, said detent structures each having an outer surface, an inner surface on a side opposite from said outer surface, and a detention ridge protruding inwardly beyond the inner surface at a location spaced from the upper surface of the base, said first and second detent structures being resiliently movable outwardly relative to each other;
  a handle protruding outwardly for providing leverage to tighten and loosen a thumbscrew on which said device is mounted;
  a third detent structure extending above the upper surface of the base, said third detent structure having a convex outer surface with a curvature that generally corresponds to the outer periphery of the base, a convex inner surface on a side opposite from said outer surface, and a detention ridge protruding inwardly beyond the inner surface at a location spaced from the upper surface of the base; and
  an open space defined between said second and third detent structures to accommodate an outer tip of the head portion of said throttle screw so that the extension device is coupled with the throttle screw without protruding outwardly past the head portion of the throttle screw other than where said handle protrudes outwardly therefrom.

12. The throttle control assembly according to claim 11, wherein said base of the thumb grip extension device is disc-shaped and said outer periphery is generally circular, said outer surfaces of the detent structures are convex with a curvature that generally corresponds to the outer periphery of the base, and said inner surfaces of the detent structures are convex with said detention ridges extending across the curved surface thereof.

13. The throttle control assembly according to claim 12, wherein said detention ridges protruding from the inner surfaces of the first and second detent structures have a tapered upper edge to cause the detent structures to spread outwardly as the device is installed over the head portion of the throttle screw to facilitate installation, wherein the inner surfaces of said detent structures have a radius of curvature that is less than a radius of curvature of the outer surfaces thereof, wherein said handle protrudes radially outwardly from the outer surface of said first detent structure, and wherein said base, detent structures and handle are all formed together as a single molded unit.

14. The throttle control assembly according to claim 12, wherein said head portion of the throttle screw has a petaloid configuration in which multiple thumb grip structures extend outwardly from a central hub.

15. The throttle control assembly according to claim 14, wherein said petaloid configuration comprises five thumb grip structures, said second and third detent structures are resiliently movable outwardly relative to said first detent structure to allow the device to be installed and retained on the head portion of the throttle screw, said second and third detent structures are angularly spaced approximately 72 degrees from each other about a center axis that extends through the upper and lower surfaces of the base, and said first detent structure is angularly spaced approximately 144 degrees from each of said second and third detent structures about said center axis.

16. The throttle control assembly according to claim 14, wherein said open a space is defined between said second and third detent structures to accommodate an outer tip of one of the thumb grip structures, and wherein an outer dimension of the head portion of the throttle screw is approximately the same as an outer dimension of the base and detent structures of the thumb grip extension device, whereby the thumb grip extension device can be coupled with the throttle screw without protruding outwardly past the outer dimension of the throttle screw other than where the handle projects outwardly therefrom.

17. In combination with a motorcycle of the type having a motorcycle handlebar and a hand grip throttle control apparatus, a throttle control assembly comprising:
a throttle screw having an upper end for engaging a throttle component, a head portion at a lower end, and a threaded portion between said upper and lower ends; and
a thumb grip extension device removably attachable to said throttle screw head portion, said thumb grip extension device comprising:
  a disc-shaped base having an upper surface, a lower surface, and an outer periphery;
  first and second detent structures extending above the upper surface of the base, said detent structures each having a convex outer surface with a curvature that generally corresponds to the outer periphery of the base, a convex inner surface on a side opposite from said outer surface, and a detention ridge protruding inwardly beyond the inner surface at a location spaced from the upper surface of the base, said first and second detent structures being resiliently movable outwardly relative to each other; and
  a handle protruding outwardly for providing leverage to tighten and loosen said throttle screw;
  a third detent structure extending above the upper surface of the base, said third detent structure having a convex outer surface with a curvature that generally corresponds to the outer periphery of the base, a convex inner surface on a side opposite from said outer surface, and a detention ridge protruding inwardly beyond the inner surface at a location spaced from the upper surface of the base; and
  an open space defined between said second and third detent structures to accommodate an outer tip of the head portion of said throttle screw so that the extension device is coupled with the throttle screw without protruding outwardly past the head portion of the throttle screw other than where said handle protrudes outwardly therefrom.

* * * * *